Oct. 10, 1961  A. J. STEFANO  3,003,258
UNIVERSAL WORLD TIME AND STAR MAP
Filed Jan. 6, 1961  5 Sheets-Sheet 1

Anthony J. Stefano
INVENTOR

Oct. 10, 1961  A. J. STEFANO  3,003,258
UNIVERSAL WORLD TIME AND STAR MAP
Filed Jan. 6, 1961  5 Sheets-Sheet 3

Anthony J. Stefano
INVENTOR

Oct. 10, 1961 A. J. STEFANO 3,003,258
UNIVERSAL WORLD TIME AND STAR MAP
Filed Jan. 6, 1961 5 Sheets-Sheet 4

Anthony J. Stefano
INVENTOR

Anthony J. Stefano
INVENTOR

United States Patent Office 3,003,258
Patented Oct. 10, 1961

3,003,258
UNIVERSAL WORLD TIME AND STAR MAP
Anthony J. Stefano, San Diego, Calif.
(Navy No. 293, Box 21, F.P.O., San Francisco, Calif.)
Filed Jan. 6, 1961, Ser. No. 81,110
2 Claims. (Cl. 35—44)

The present invention relates to scientific instruments generally and in particular to a geographical instrument.

A primary object of the present invention is to provide a geographical instrument having means for determining the day of the month and the exact time at any place in the world.

Another object of the present invention is to provide an instrument to ascertain the approximate longitude and latitude from the observation of celestial bodies.

A further object of the present invention is to provide an instrument of identification of stars and constellations.

Other objects include the provision of an instrument of the above type wherein a plurality of discs cooperate with each other to define maps and scales for determining the desired information.

A still further object of the present invention is to provide a world time and star map which is of simple construction, one having a minimum number of parts, one which is economical to manufacture and assemble, and one which is highly effective in action.

Figure 1:
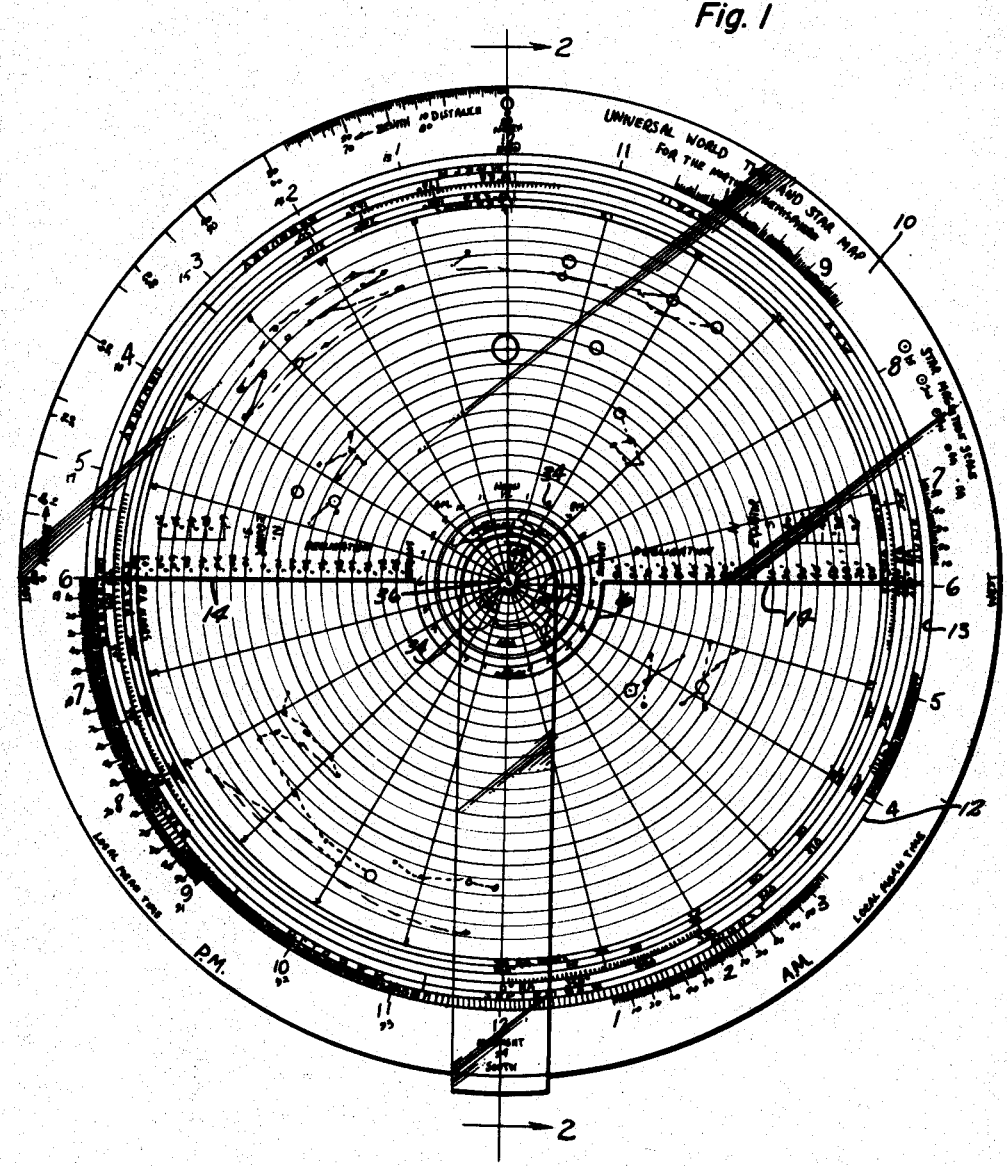
Figure 1A:
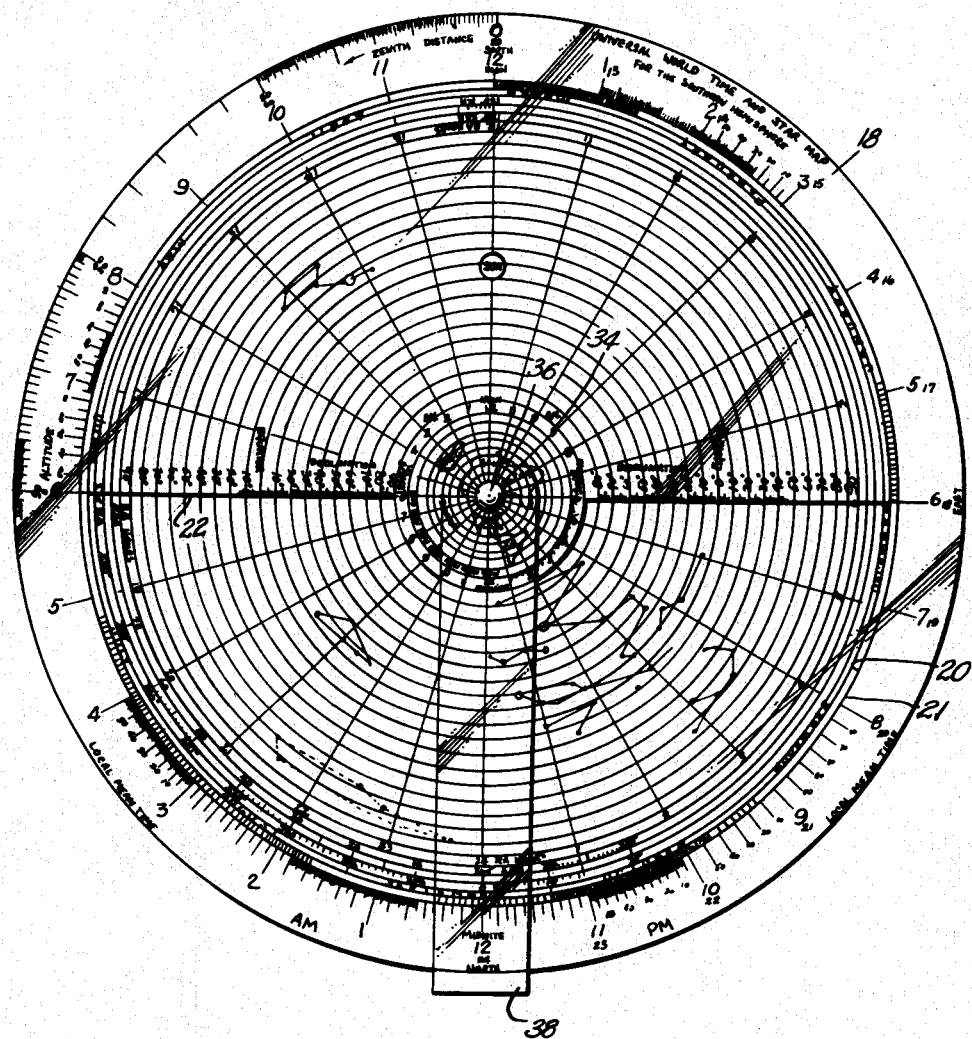
Figure 2:
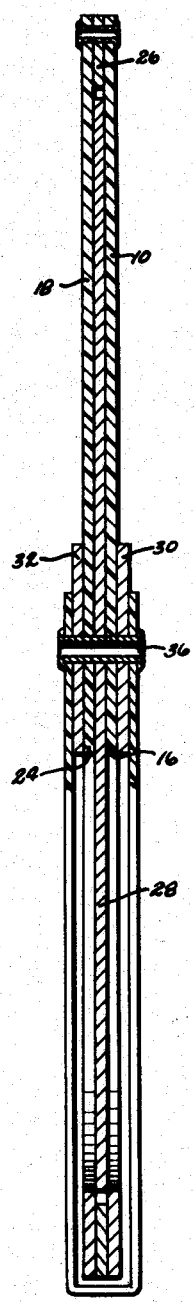
Figure 4:
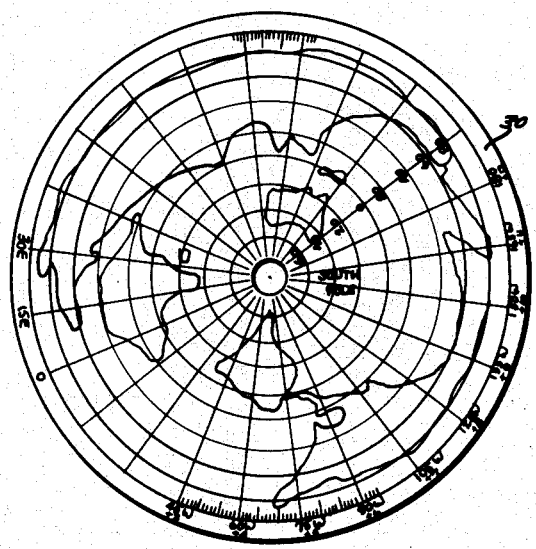
Figure 5:
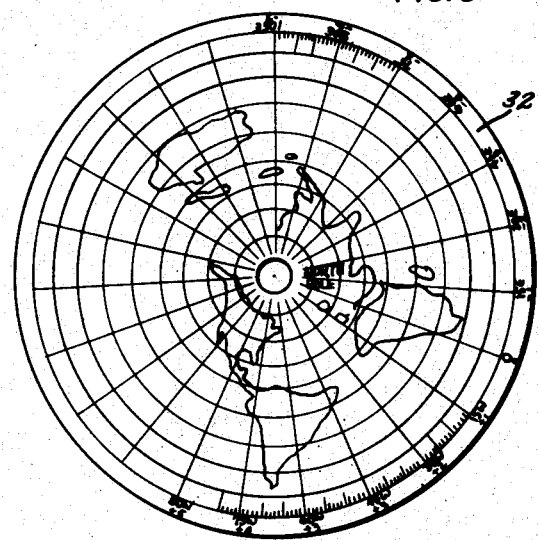
Figure 3:
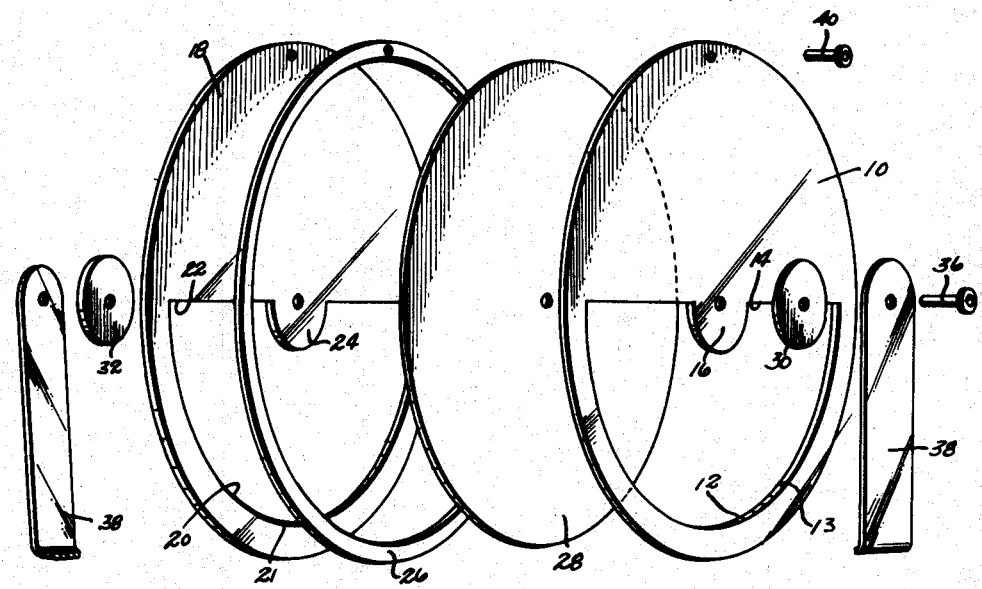
Figure 6:
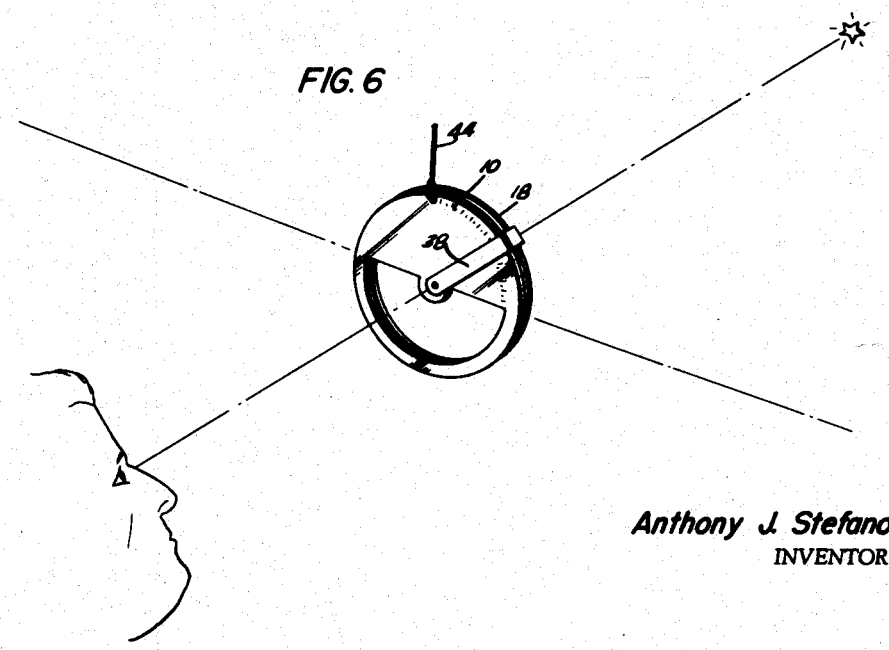

These and other objects and advantages of the present invention will be fully apparent from the following description when taken in connection with the annexed drawings, in which:

FIGURE 1 is a plan view of the universal world time and star map of the present invention, showing one side, FIGURE 1—A is a plan view of the map showing the other side, FIGURE 2 is a view taken on the line 2—2 of FIGURE 1, FIGURE 3 is an isometric exploded view of the components of the invention, the pointer element being broken in half, FIGURE 4 is a plan view of a south polar map, FIGURE 5 is a plan view of a north polar map, and FIGURE 6 is an isometric view showing the device of the present invention in use as an astrolab.

Figure 7:
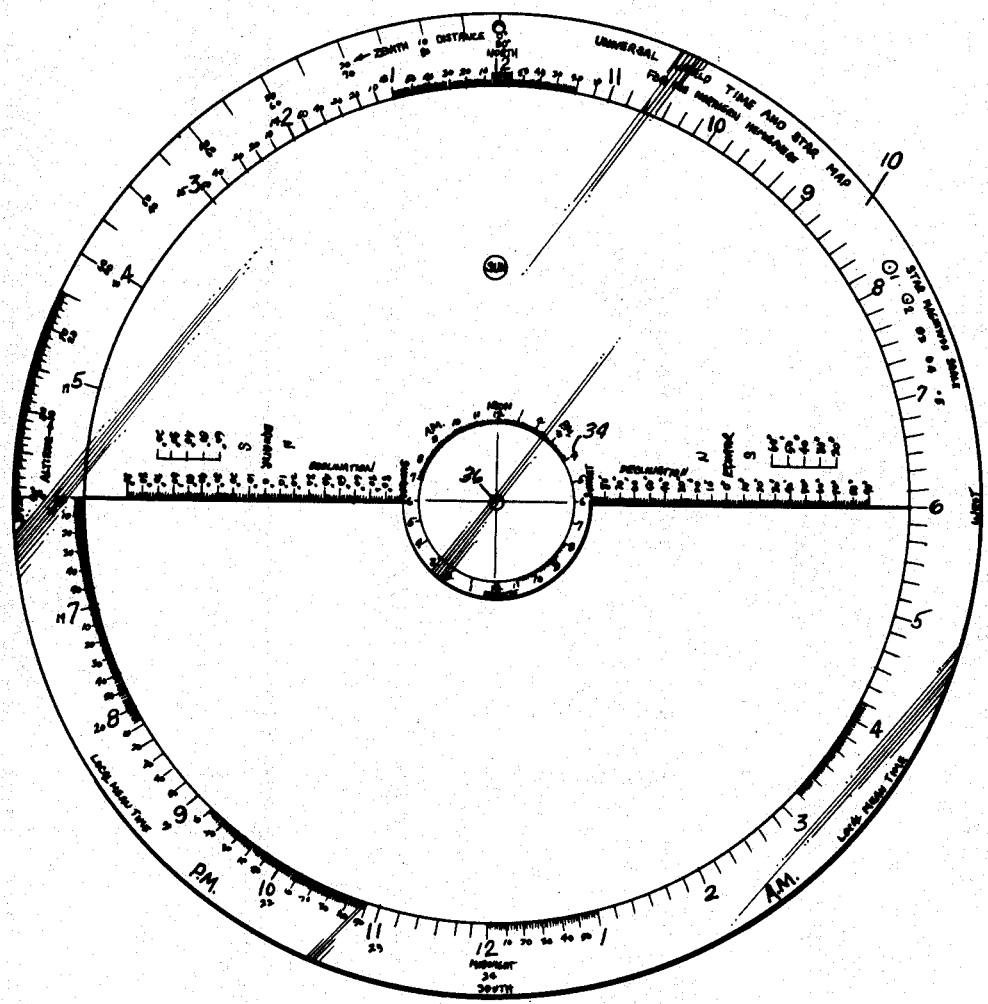

FIGURE 7 is a plan view of the base plate in FIGURE 1 showing the construction and details of the base plates.

With continued reference to the drawings in which like numerals indicate like parts throughout the several views, the universal world time and star map of the present invention comprises a first circular base plate 10 having an opening 12 therethrough, one wall 13 of the opening 12 being semi-circular, and the outer wall 14 extending diametrically and provided with a first semi-circular mask 16 depending from the wall 14.

A second circular base plate 18 is provided with an opening 20 having one wall 21 semi-circular, and having the other wall 22 extending diametrically and provided with a second semi-circular mask 24 depending from the wall 22.

A ring 26 is interposed between the peripheral portions of the first and second base plates 10 and 18 and is fixedly secured thereto. The base plates 10 and 18 are positioned so that their openings 12 and 20 are in alignment and so that the masks 16 and 24 are also in alignment.

The ring 26 with the adjacent peripheral portions of the first and second base plates 10 and 18 define a pocket.

A large star disc 28 is disposed in the pocket with its center aligned with the centers of the masks 16 and 24. One face of the disk 28 has indicia thereon representing the stars as seen in the Northern Hemisphere and the other disc face has star indicia thereon representing stars of the Southern Hemisphere.

A small world map disc 30 overlies the base plate 10 and is concentric thereto and another world map disc 32 overlies the base plate 18 and is concentric thereto.

Each of base plates 10 and 18 and the masks 16 and 24 have a time ring area, as at 34, thereon extending about and from the periphery of the respective masks 16 or 18.

The map discs 30 and 32 are of a lesser diameter than the adjacent time ring area 34 and lie therewithin.

The diametrically extending walls 14 and 22 of the base plates 10 and 18 define the momentary night areas of the map discs 30 and 32.

The map discs 30 and 32 have radial lines to facilitate their alignment with the adjacent time ring area 34 and the associated diametrically extending wall 14, 22.

Means, embodying a rivet 36, extends through the centers of the star discs 28, through the centers of the map discs 30 and 32, and through the centers of the base plates 10 and 18 and rotatably supports the star disc 28 and the map discs 30 and 32 for rotation relative to each other.

A U-shaped pointer element 38 fabricated of transparent and rigid material, has its bight extending over the peripheries of the base plates 10 and 18 and has the free ends of its legs rotatably supported upon the rivet 36.

Another rivet 40 extends through the base plates 10 and 18 and through the ring 26 adjacent to peripheries thereof and forms a means by which a cord 44 may be attached, as in FIGURE 6, so that the pointer element and the base plates 10 and 18 may be employed as an astrolab, the rivet is designated by the numeral 36 in FIGURES 1, 1A, 2, and 3.

The use of the instrument of the present invention is obvious. By revolving a specific location on the world map disc 30 or 32 to the current time clock designated by the indicia within the associated time ring area 34, it is possible to determine the time and day of all the places of the world simultaneously.

The star disc 28 has both of its faces provided with indicia representing the location of the various stars and constellations in the northern and southern skies. By rotating the designated location on either of the map discs 30 or the map disc 32 to the present time of the time ring area 34, the stars and constellations, together with the sun may be visualized in their proper relationship with respect to the earth in the night sky.

Other uses will become apparent to the user of the device of the present invention according to the information which is desired. It will be seen therefore that the universal world time and star map of the present invention may be manufactured in quantity at reasonable cost, can be made to be accurate to the optimum degree of accuracy, may be very easily and readily assembled and disassembled and may be constructed of such material as plastic or the like to make it endurable and not subject to weather conditions such as might be found aboard ship or the like.

While only a preferred form of the invention is shown and described other forms of the invention are contemplated and numerous changes and modifications may be made therein without departing from the spirit of the invention as set forth in the appended claims.

What is claimed is:

1. A universal world time and star map comprising a first circular base plate having an opening therethrough, one wall of the opening being semi-circular and the other wall extending diametrically and provided with a semi-circular mask depending from said other wall, a second circular base plate having an opening therethrough, one wall of the opening being semi-circular and the other wall extending diametrically and provided with a semi-circular mask depending from said other wall, said first and second base plates being positioned in face-to-face spaced relation with the openings in alignment and with said masks in alignment, a ring interposed between the peripheral portions of said first and second base plates and defining with said base plates a pocket, a large star disc disposed in said pocket and having its center aligned with the centers of said masks, a small world map disc overlying each of said first and second base plates concentric thereto, each of said base plates and said masks having a time ring area thereon extending about and from the periphery of the masks, said world map discs each being of a lesser diameter than the adjacent time ring area and lying concentrically thereto, the diametrically extending walls of the openings of said first and second base plates defining the momentary night areas of the map discs, said map discs having radial lines to facilitate their alignment with the adjacent time ring and the associated diametrically extending wall, and means extending through the centers of said star disc, map discs, first and second base plates and ring to rotatably support the map and star discs on said base plates.

2. A universal world time and star map comprising a first circular base plate having an opening therethrough, one wall of the opening being semi-circular and the other wall extending diametrically and provided with a semi-circular mask depending from said other wall, a second circular base plate having an opening therethrough, one wall of the opening being semi-circular and the other wall extending diametrically and provided with a semi-circular mask depending from said other wall, said first and second base plates being positioned in face-to-face spaced relation with the openings in alignment and said masks in alignment, a ring interposed between the peripheral portions of said first and second base plates and defining with said base plates a pocket, a large star disc disposed in said pocket and having its center aligned with the centers of said masks, a small world map disc overlying each of said first and second base plates concentric thereto, each of said base plates and said masks having a time ring area thereon extending about and from the periphery of the masks, said world map discs each being of a lesser diameter than the adjacent time ring area and lying concentrically thereto, the diametrically extending walls of the openings of said first and second base plates defining the momentary night areas of the map discs, said map discs having radial lines to facilitate their alignment with the adjacent time ring and the associated diametrically extending wall, means extending through the centers of said star disc, map discs, first and second base plates and ring to rotatably support the map and star discs on said base plates, and a U-shaped rigid pointer element having its bight extending over the peripheries of said first and second base plates and having the free ends of the legs thereof rotatably supported on said means.

References Cited in the file of this patent
UNITED STATES PATENTS
2,921,386     Stefano _____ Jan. 19, 1960